United States Patent [19]

Riestra et al.

[11] Patent Number: 5,678,906
[45] Date of Patent: Oct. 21, 1997

[54] DECORATIVE PANEL

[75] Inventors: Jose Riestra; Nestor Perez, both of Miami, Fla.

[73] Assignee: Marble Lite Products, Inc., Hialeah Gardens, Fla.

[21] Appl. No.: 528,338

[22] Filed: Sep. 14, 1995

[51] Int. Cl.⁶ .................................................. A47B 97/00
[52] U.S. Cl. ........................... 312/204; 264/255; 220/675; 428/161
[58] Field of Search .......................... 52/796.1, 796.11; 264/255, 280; 428/161, 480; 312/204, 352; 425/405.2, 425; 220/DIG. 12, 674, 675, 678, 608, 623

[56] References Cited

U.S. PATENT DOCUMENTS 3,797,904  3/1974  Krauth .
4,141,944  2/1979  Anstadt et al. .
4,244,993  1/1981  Platka ........................................ 428/15
4,753,836  6/1988  Mizell .

Primary Examiner—Peter M. Cuomo
Assistant Examiner—Gerald A. Anderson
Attorney, Agent, or Firm—Holland & Knight LLP

[57] ABSTRACT

A panel is provided for use in the fabrication of cabinet doors, the face portion of drawers and the like which comprises a combination of two resin materials, one of which has a selected color, which are simultaneously cured within a mold to form recesses and raised portions of essentially any desired ornamental design.

3 Claims, 1 Drawing Sheet

DECORATIVE PANEL

FIELD OF THE INVENTION

This invention relates to decorative panels, and, more particularly, to the combination of an unsaturated polyester resin and a gelcoat resin of selected color which are moldable in an ornamental design to form panels utilized in the fabrication of cabinet doors, the face portion of drawers and the like.

BACKGROUND OF THE INVENTION

Kitchen cabinets, bathroom vanities, and other cabinet constructions have historically employed various types of wood, such as oak, pine, birch and particle or pressed board in their construction. In order to enhance the ornamental appearance of the structures, the doors, face portions of the drawers and other panels are often provided with a decorative design. Such designs include patterns of recesses extending from the outer surface into the interior of the wood panels, and/or sections of molding fixed to the outer surface.

Although it is possible with the use of routers and other power tools to form essentially any design of recesses within a wood panel, such operations are time consuming and often involve a substantial amount of hand labor. The same is true when moldings or other pieces of material are affixed to the outer surface of the wood panels. Additionally, a separate operational step is required to apply coatings to the panel, e.g., a primer coat and finish coat of paint or the like. All of these operations add a great deal of expense to the doors, drawer faces and other panels of cabinets made therefrom, and slow production, particularly when attempting to mass produce items of this type.

SUMMARY OF THE INVENTION

It is therefore among the objectives of this invention to provide a decorative panel construction for use in the fabrication of cabinet doors, the face portion or drawers and the like which involves minimal manual labor, which can be formed in essentially any ornamental design, which is easily manufactured in quantity, and, which is extremely economical.

These objectives are obtained in a decorative panel, and a method for making same, which employs a combination of two resin materials which are simultaneously cured within a mold formed with recesses and raised portions of essentially any desired ornamental design.

In the presently preferred embodiment, the primary resin material is an unsaturated polyester resin which, when cured, exhibits many of the characteristics of wood. The cured resin material can be cut and drilled like wood to permit the attachment of hinges, door latches, and other hardware. Further, such resin material is resistant to bowing or warping and has approximately the same weight and feel as a wood panel of similar thickness.

The second resin material is a thin layer affixed to the outer surface of the primary resin layer to provide the finished panel with a particular color, as desired. One preferred material for this second resin layer is a gelcoat resin which is available in a variety of colors.

In the presently preferred embodiment, a mold is fabricated having the desired ornamental design of the finished panel for a cabinet door or the like. A gelcoat resin is poured in liquid form into the mold and then the primary, unsaturated polyester resin is poured in liquid form atop the gelcoat resin. These two resins are then allowed to cure, and when removed from the mold, form the finished panel. One important advantage of this construction is that intricate, ornamental designs can be formed in the finished panels of this invention, and then repeated identically in subsequent panels, once a particular mold is designed and built. A minimum of manual labor is involved since the resins are merely poured into the mold one on top of the other and allowed to cure. No separate operations are required to form recesses or add molding strips to the panel formed herein, and the finished color of the panel is obtained with the gelcoat resin without further coating steps. Consequently, the panels of this invention can be fabricated and sold at a substantially reduced cost compared to wood panels having comparable similar designs or color coatings.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1b is a cross-sectional view taken generally along line 1b—1b of FIG. 1a.

DETAILED DESCRIPTION OF THE INVENTION

Figure 1A:
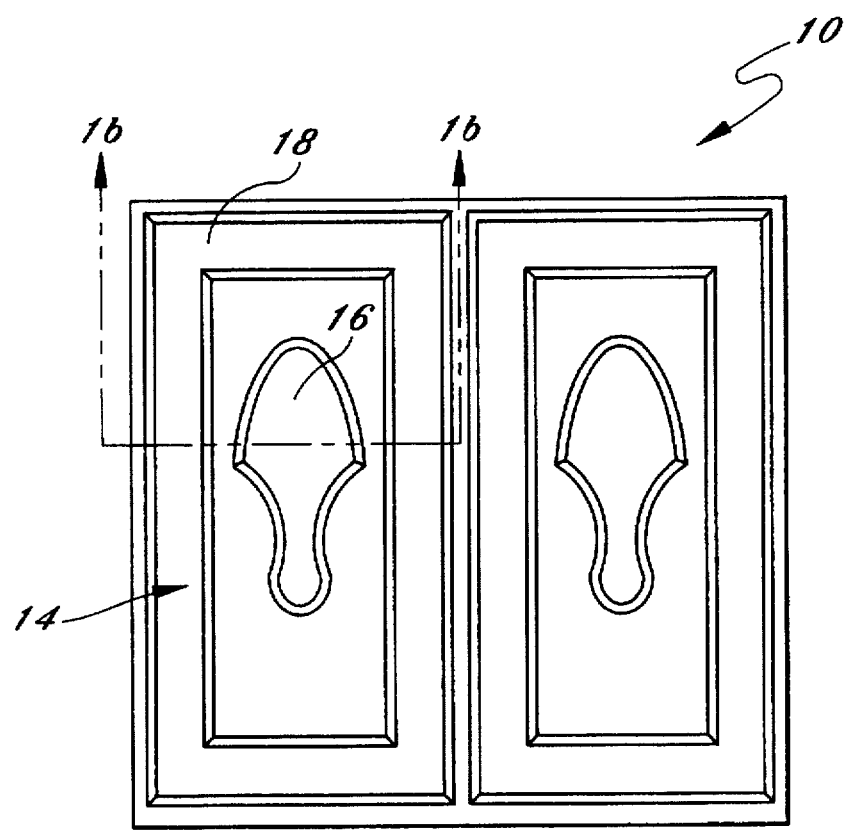
FIG. 1a view of a finished panel in accordance with this invention having a desired ornamental appearance.
Figure 1B:
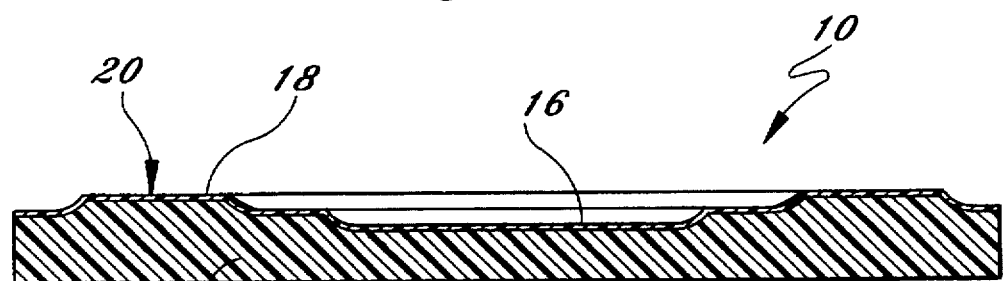
Figure 2:
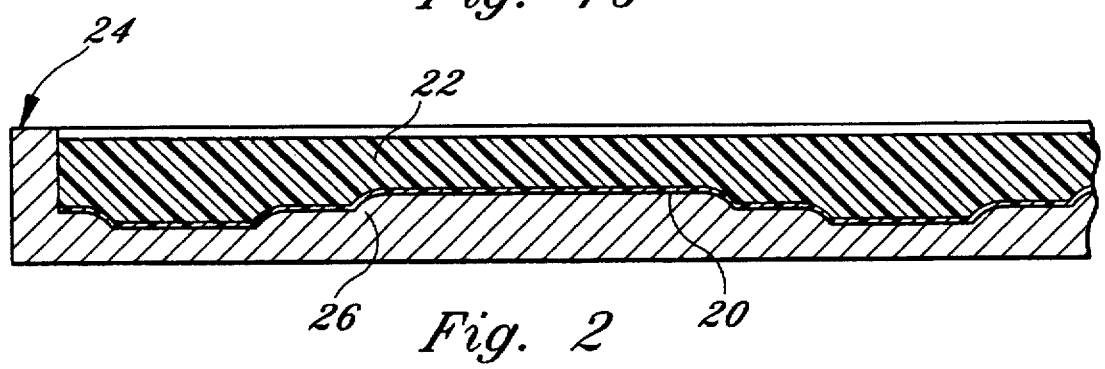
FIG. 2 is a schematic view of a mold in which the two resin materials employed in this invention are being cured.

Referring now to the FIGS., a panel 10 is depicted in accordance with this invention having an outer surface formed with a decorative or ornamental design 14 as schematically shown. For purposes of the present discussion, the panel 10 is depicted in the size and shape as would be utilized for the door of a bathroom vanity, kitchen cabinet, or similar structures. It should be understood, however, that the panel 10 of this invention can be formed of a size and shape to be used for the front face of panel of a drawer (not shown) or essentially any other panels in which an ornamental design is desired. Further, the particular ornamental design 14 depicted in FIG. 1 is solely for purposes of illustration, and it is contemplated that essentially any combination of recesses and raised areas, such as recesses 16 and raised areas 18, could be formed in the panel 10, as desired.

In the presently preferred embodiment, the panel 10 is formed with a thin, outwardly facing layer 20 affixed to a primary layer 22. These layers 20, 22 are combined with one another and co-cured within a mold 24 as described in more detail below.

The thin layer 20 of panel 10 is preferably formed of a gelcoat resin of the type commercially available from Polyguard Inc. of Tampa, Florida. This gelcoat resin is available in a variety of colors and has the following physical properties:

boiling range: 290° F.
evaporation rate: slower than n-butyl acetate
volatiles volume: less than 50%
vapor density: heavier than air
liquid density: lighter than water
weight per gallon: 8.8 lbs.
specific gravity: 1.06

The primary layer 22 is preferably formed of an unsaturated polyester resin material commercially available from Ashland, Inc. of Columbus, Ohio under the name Ashland Aropol WEP 662 resin. This resin material is a combination of 38–42% polyester resin and 58–62% styrene, by weight.

The panel 10 of this invention is formed as follows. Initially, a mold 24 is fabricated have a bottom surface 26 formed with the particular ornamental design of the finished panel 10, e.g., a pattern of recesses and raised areas, as desired. The gelcoat resin forming thin layer 20 is then poured in liquid form atop the bottom surface 26 of mold 24 covering the entire surface thereof. While the thin layer 20 is still in liquid form, the resin material forming primary layer 22 is poured atop the gelcoat resin within mold 24 to the desired thickness of the finished panel 10. The resin materials are allowed to co-cure within the mold 24, and it was unexpectedly found that such resin materials permanently attach to one another to form the combined layers 20, 22 of the finished panel 10.

As depicted in the FIGS., the thin layer 20 forms a very small part of the total thickness of the finished panel 10. In most applications, it is contemplated that thin layer 20 will be no more than a few thousandths of an inch, whereas the primary layer 22 comprises the bulk of the overall thickness of panel 10. The gelcoat resin material forming thin layer 20 is primarily intended to provide the finished panel 10 with the desired color so that a separate operation is not required to apply a colored coating material to panel 10. The Ashland Aropol WEP 662 P resin forming primary layer 22 exhibits many of the same properties as wood material when cured. This allows the finished panel 10 to be cut and drilled as necessary in order to affix hardware for doors, drawers and the like. Further, the resin material forming primary layer 22 is resistant to warping and bending, and thus provides a finished panel 10 having essentially equivalent properties to that of wood.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, while a particular resin material available from Ashland, Inc. is identified above for use in forming primary layer 22, it is contemplated that other resin materials which exhibit properties resembling wood as discussed herein could be utilized.

Therefore, it is intended that the invention not be limited to the particular embodiment disclosed as the best mode contemplated for carrying out the invention, but that the invention will include all embodiments falling within the scope of the appended claims.

What is claimed is:

1. A decorative panel, comprising:

a first layer formed of Ashland Aropol WEP 662 P unsaturated polyester resin material;

a second layer formed of a gelcoat resin material having a selected color;

said first and second resins being successively poured into a mold having an ornamental design, one atop the other while both said resins are in liquid form, and co-cured therein to form said first and second layers which are permanently attached to one another and shaped in the ornamental design of the mold.

2. The decorative panel of claim 1 in which said second layer formed of said second resin having a selected color is thin compared to the thickness of said first layer formed of said resin.

3. The panel of claim 1 in which said first layer is formed of a combination of 38–42% polyester resin and 58–62% styrene, by weight.

* * * * *